(12) United States Patent
Henry et al.

(10) Patent No.: US 12,666,072 B2
(45) Date of Patent: Jun. 23, 2026

(54) METHOD FOR CONSTRUCTING A DEPTH IMAGE FROM A MULTIVIEW VIDEO, METHOD FOR DECODING A DATA STREAM REPRESENTATIVE OF A MULTIVIEW VIDEO, ENCODING METHOD, DEVICES, SYSTEM, TERMINAL EQUIPMENT, SIGNAL AND COMPUTER PROGRAMS CORRESPONDING THERETO

(71) Applicant: ORANGE, Issy-les-Moulineaux (FR)

(72) Inventors: Félix Henry, Châtillon Cedex (FR); Patrick Garus, Châtillon Cedex (FR)

(73) Assignee: ORANGE, Issy-les-Moulineaux (FR)

( * ) Notice: Subject to any disclaimer, the term of this patent is extended or adjusted under 35 U.S.C. 154(b) by 171 days.

(21) Appl. No.: 18/573,015

(22) PCT Filed: Jun. 13, 2022

(86) PCT No.: PCT/FR2022/051126
§ 371 (c)(1),
(2) Date: Dec. 21, 2023

(87) PCT Pub. No.: WO2022/269163
PCT Pub. Date: Dec. 29, 2022

(65) Prior Publication Data
US 2024/0292017 A1 Aug. 29, 2024

(30) Foreign Application Priority Data
Jun. 25, 2021 (FR) ...................................... 2106867

(51) Int. Cl.
*H04N 19/176* (2014.01)
*H04N 19/119* (2014.01)
(Continued)

(52) U.S. Cl.
CPC ......... *H04N 19/517* (2014.11); *H04N 19/119* (2014.11); *H04N 19/139* (2014.11);
(Continued)

(58) Field of Classification Search
CPC .. H04N 19/517; H04N 19/119; H04N 19/139; H04N 19/176; H04N 19/46; H04N 19/597
(Continued)

(56) References Cited

FOREIGN PATENT DOCUMENTS

| WO | 2009091383 A2 | 7/2009 |
| WO | 2009091383 A3 | 9/2009 |

OTHER PUBLICATIONS

International Search Report dated Sep. 23, 2022 for corresponding International Application No. PCT/FR2022/051126, filed Jun. 13, 2022.
(Continued)

*Primary Examiner* — Nguyen T Truong
(74) *Attorney, Agent, or Firm* — David D. Brush; Westman, Champlin & Koehler, P.A.

(57) ABSTRACT

A method for constructing a depth image associated with a view of a multiview video, called current view, from a data stream representative of the video. The stream includes information representative of the motion vectors of a texture image associated with the current view with respect to at least one reference texture image, the texture image having been divided into blocks. The method includes: obtaining the motion vectors from the information encoded in the stream; when at least one motion vector has been obtained for at least one block, called current block, of the texture image, motion-compensating a block of the depth image, co-located with the current block, from the at least one motion vector and at least one available reference depth
(Continued)

image, the reference depth image being associated with the same view as the reference texture image.

15 Claims, 8 Drawing Sheets

(51) Int. Cl.
      *H04N 19/139*        (2014.01)
      *H04N 19/46*         (2014.01)
      *H04N 19/517*        (2014.01)
      *H04N 19/597*        (2014.01)
(52) U.S. Cl.
      CPC ........... *H04N 19/176* (2014.11); *H04N 19/46* (2014.11); *H04N 19/597* (2014.11)
(58) Field of Classification Search
      USPC .................................................... 375/240.16
      See application file for complete search history.

(56)                    References Cited

OTHER PUBLICATIONS

Written Opinion of the International Searching Authority dated Sep. 23, 2022 for corresponding International Application No. PCT/FR2022/051126, filed Jun. 13, 2022.
English translation of the Written Opinion of the International Searching Authority dated Sep. 23, 2022 for corresponding International Application No. PCT/FR2022/051126, filed Jun. 13, 2022.

Ying Chen et al., "Description of 3D video coding technology proposal by Qualcomm Incorporated", 98. MPEG Meeting; Nov. 28, 2011-Dec. 2, 2011; Geneva; (Motion Picture Expert Group or ISO/IEC JTC1/SC29/WG11), No. m22583, Nov. 21, 2011 (Nov. 21, 2011), p. 1-21, XP030051146.
Anonymous, "Test Model under Consideration for AVC based 3D video coding", No. n12349, Dec. 3, 2011 (Dec. 3, 2011), 98. MPEG Meeting; Nov. 28, 2011-Dec. 2, 2011; Geneva; (Motion Picture Expert Group or ISO/IEC JTC1/SC29/WG11), Retrieved from the Internet: URL:http://phenix.int-evry.fr/mpeg/doc_end_user/documents/98_Geneva/wg11/w12349.zip w12349 (3DV TMuC AVC).doc, XP030018844.
Gianluca Cernigliaro et al., "Low Complexity Mode Decision and Motion Estimation for H.264/AVC Based Depth Maps Encoding in Free Viewpoint Video", IEEE Transactions on Circuits and Systems for Video Technology, IEEE, USA, vol. 23, No. 5, May 1, 2013 (May 1, 2023), p. 769-783, XP011506459.
Stankiewicz, O. et al., "Enhanced Depth Estimation Reference Software (DERS) for Free-viewpoint Television", ResearchGate Article, MPEG2013/M31518, Oct. 2013.
Boyce, J. et al., "MPEG Immersive Video Coding Standard", Invited Paper, Proceedings of the IEEE, Digital Object Identifier 10.1109/JPROC.2021.3062590, Accepted Feb. 19, 2021.
Sun, W. et al., "An overview of free viewpoint Depth-Image-Based Rendering (DIBR)", Proceedings of the Second APSIPA Annual Summit and Conference, pp. 1023-1030, Dec. 14-17, 2010.
Mieloch, D. et al., "Depth Map Refinement for Immersive Video", IEEE Access, Digital Object Identifier 10.1109/ACCESS.2021.3050554, vol. 9, current version dated Jan. 20, 2021.
Guo, X. et al., "Group-wise Correlation Stereo Network", arXiv:1903.04025v1 [cs.CV] Mar. 10, 2019.

VMV

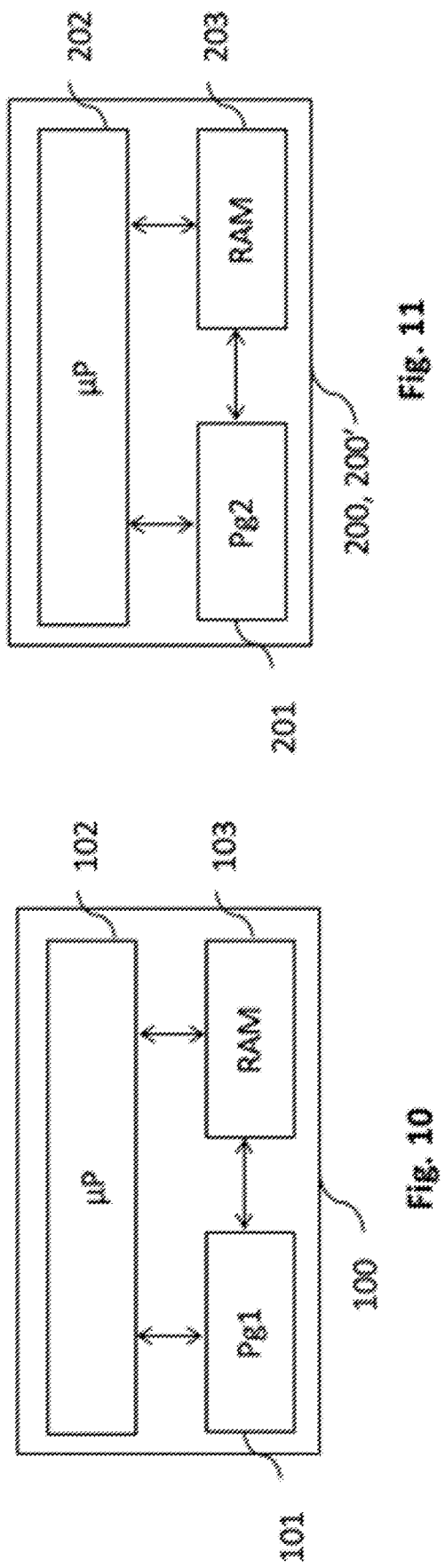
Fig. 11
Fig. 10
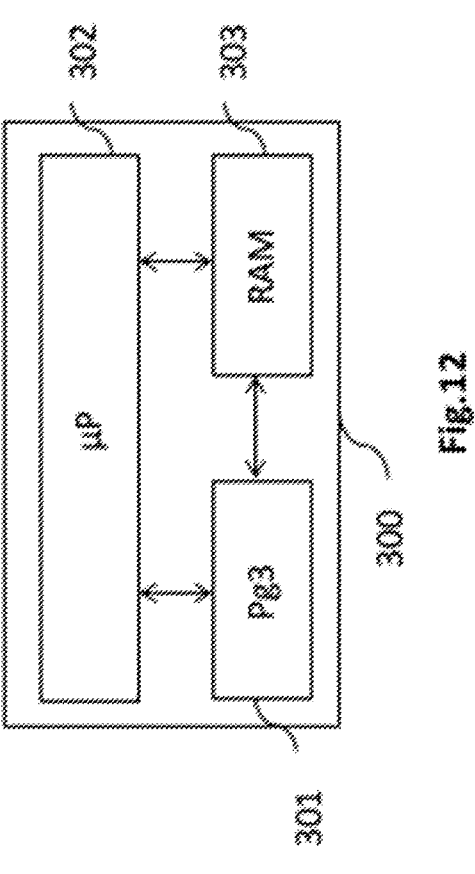
Fig. 12

METHOD FOR CONSTRUCTING A DEPTH IMAGE FROM A MULTIVIEW VIDEO, METHOD FOR DECODING A DATA STREAM REPRESENTATIVE OF A MULTIVIEW VIDEO, ENCODING METHOD, DEVICES, SYSTEM, TERMINAL EQUIPMENT, SIGNAL AND COMPUTER PROGRAMS CORRESPONDING THERETO

CROSS-REFERENCE TO RELATED APPLICATIONS

This Application is a Section 371 National Stage Application of International Application No. PCT/FR2022/051126, filed Jun. 13, 2022, which is incorporated by reference in its entirety and published as WO 2022/269163 A1 on Dec. 29, 2022, not in English.

TECHNICAL FIELD OF THE INVENTION

The present invention relates generally to the field of 3D image processing, and more specifically to decoding multiview image sequences and, in particular, to constructing a depth image associated with a current view, from information encoded in the data stream and representative of a texture image of the same current view.

PRIOR ART

In the field of virtual reality and immersive video, free navigation allows the viewer to view a scene from any viewpoint, whether that viewpoint corresponds to a viewpoint captured by a camera or a viewpoint that has not been captured by a camera, using a device such as a head-mounted display. Such a view that has not been captured by the camera is called a virtual view or an intermediate view because it lies between views captured by the camera and must be synthesised for rendering the scene to the viewer from the captured views.

In an immersive video context, that is where the viewer has the feeling of being immersed in the scene, the scene is typically captured by a set of cameras, as illustrated in FIG. 1. These cameras can be of type 2D (cameras $C_1, C_2 \ldots C_N$, with N a non-zero integer in FIG. 1), that is each of them captures a view from one viewpoint, or of type 360, that is they capture the entire scene 360 degrees around the camera (camera $C_{360}$ in FIG. 1), therefore from several different viewpoints. The cameras can be arranged in an arc, a rectangle, or any other configuration that provides good coverage of the scene.

In relation to FIG. 2, at a given time, a set of images representing the scene from different views is obtained. Since this involves videos, the captured images are time-sampled (30 images per second, for example) to produce an original multiview video, as shown in FIG. 3.

The item of information captured by these cameras is encoded in a data stream and transmitted to a decoder, that will decode all or part of these views. A view synthesis is then applied to synthesise the view requested by the user at a given time, depending on their position and their viewing angle of the scene.

From the document entitled "An overview of free viewpoint Depth-Image-Based Rendering (DIBR)", by Wenxiu SUN, Lingfeng XU, Oscar C. AU, Sung Him CHUI, Chun Wing, KWOK The Hong Kong University of Science and Technology, published in the Proceedings of the Second APSIPA Annual Summit and Conference, pages 1023-1030, Biopolis, Singapore, held on 14-17 Dec. 2010, available at the following address http://www.apsipa.org/proceedings_2010/pdf/APSIPA197.pdf, an image synthesis technique called "Depth-Based Image Rendering" (DIBR) is known.

According to this technique, several views of the scene are available, and each view contains a texture component (that is the image in the conventional sense) and a depth component (that is a depth map, for which the intensity of each pixel is associated with the depth of the scene at that point). Thus, both the colour at each point in the scene and the geometry of the objects are known. From one viewpoint, a partial geometry of the scene is known (the geometry of what is behind an object, that is the occluded zones, cannot be known), but by multiplying the viewpoints, it is possible to obtain near-total coverage of the geometry of the scene. When the viewer requests to see the scene from a particular viewpoint, the pixels of one or more views are projected using the depth component, possibly by recombining the projections from several views in order to resolve the occlusions.

Techniques for estimating the depth of a pixel in a texture image from one or more other texture images are also known, such as the DERS (Depth Estimation Reference Software) technique, described in particular in the document entitled "Enhanced Depth Estimation Reference Software (DERS) for Free-viewpoint Television", by Stankiewicz et al, published in October 2013 by the ISO and available at the following link: https://www.researchgate.net/publication/271851694_Enhanced_Depth_Estimation_Reference_Software_DERS_for_Free-viewpoint_Television, the IVDE ("Immersive Video Depth Estimation") technique, described in the document entitled "Depth Map Refinement for Immersive Video", by D. Mieloch, published on 11 Jan. 2021 by IEEE and available at the following link: https://www.researchgate.net/publication/348408067_Depth_Map_Refinement_for_Immersive_Video, or a technique based on a neural approach, such as GANet, described for example in the document available at the following link: https://github.com/feihuzhang/GANet, or finally GWCNet described for example in the document entitled "Group-wise Correlation Stereo Network", by Guo et al., published in March 2019 and available at the following link: https://arxiv.org/pdf/1903.04025.pdf. These various techniques seek to estimate the disparity of a pixel between two or multiple views. Disparity is the displacement of the pixel in the image when the view is changed. When the disparity of a pixel and the position and orientation parameters and the characteristics of the cameras that captured each of these views are known, depth can be deduced simply.

Finally, from the MPEG-I Part 12 standard, also called MIV ("MPEG Immersive Video"), described in the document entitled "MPEG Immersive Video Coding Standard", by J. M. Boyce et al, published by IEEE in February 2019 and available at the address https://ieeexplore.ieee.org/stamp/stamp.jsp?tp=&arnumber=9374648, a technique for encoding and decoding a multiview video is known. This standard describes in particular an encoding and decoding profile called "Geometry Absent", according to which (FIG. 4, where only the views at a time T are shown) only the components or images of original textures TO are encoded. No depth information is therefore transmitted in the encoded data stream. On the decoder side, a decoded version $T_D$ of the texture images is obtained from the information encoded in the data stream. The depth components $P_E$ of one or more views are then estimated from the decoded texture images $T_D$. In this way, the decoded texture images and the estimated depth images are available for any subsequent DIBR synthesis of a view V, in response to the user's request at time T.

The "Geometry Absent" profile of the MIV standard has several advantages:

the depth component is not transmitted, which reduces the amount of data to be processed (encoding, transmission and decoding) and saves computing and bandwidth resources;

the depth component is not captured during the acquisition of the multiview video of the scene, so there is no need for specific detection and distance estimation devices such as LIDAR (Laser Imaging Detection And Ranging), based on the analysis of the properties of a light beam returned to its emitter. However, a major disadvantage of this approach is that it requires in return an estimation of this depth component in the decoding device. But this estimation is very costly in terms of computing resources, which poses a problem when the decoding device is embedded in a user terminal that is lighter and more resource-constrained than the encoding device, such as a smartphone, a set-top box, a head-mounted display or, more generally, a connected object.

There is therefore a need for a solution that is less complex and more economical in terms of computing resources. The invention improves the situation.

DISCLOSURE OF THE INVENTION

The invention responds to this need by proposing a method for constructing a depth image associated with a view of a multiview video, called current view, from a data stream representative of said video, said stream comprising information representative of the motion vectors of a texture image associated with said current view with respect to at least one reference texture image, said texture image having been divided into blocks.

Said method comprises:

obtaining said motion vectors from the information encoded in the stream;

when at least one motion vector has been obtained for at least one block, called current block of the texture image, motion-compensating a block of the depth image, co-located with the current block, from said at least one motion vector and at least one available reference depth image, said reference depth image being associated with the same view as said reference texture image.

The invention proposes a completely new and inventive approach to constructing a depth image of a view of a multiview video, when it has not been transmitted in the data stream. It consists in using the motion vectors transmitted in the stream for the texture image associated with the same view to motion-compensate at least part of this depth image from an available reference depth image (already decoded or constructed in accordance with the construction method according to the invention) and associated with the same view as the reference texture image.

Such a motion compensation is much less complex to implement than estimating the depth image from the texture images according to one of the above-mentioned prior art techniques, such as DERS, IVDE, GaNet, etc. The resources of the receiving terminal are therefore preserved.

The invention has a particular application in the case of the "Geometry Absent" profile defined by the MIV encoding standard, according to which no depth information is transmitted in the encoded data stream.

Advantageously, when no motion vector has been decoded for said at least one block of the texture image, for example according to the INTRA encoding mode or another encoding mode that does not use a motion vector, the method does not trigger the implementation of said motion compensation of said at least one block and comprises the estimation of said at least one block of the depth image from at least one previously processed texture image.

According to one aspect of the invention, the method comprises obtaining a motion compensation flag from an item of information encoded in the stream, said flag being associated with said block of the depth image, and the method comprises deciding to implement said motion compensation when the flag is set to a predetermined value.

One advantage is that it is possible to decide on the encoder side for which elements of the depth image the reconstruction of the depth image by motion compensation is allowed and to transmit this decision via this flag. This embodiment advantageously applies to the case where the depth image of the current view has actually been captured on the encoder side, and then used to evaluate a level of performance of the motion compensation for this image, for example by comparing the motion-compensated depth image with the depth image actually captured. Such a comparison enables an error to be calculated, for example a quantity of energy of a residue between the depth image actually captured and the motion-compensated depth image from the motion vectors of the texture image associated with the current view. In this case, if the error satisfies a predetermined error criterion, for example if the amount of energy calculated is below a predetermined threshold, the flag is set to the predetermined value, for example equal to 1, otherwise the flag is set to another value, for example equal to 0.

In this way, motion compensation is only implemented for all or part of the depth image when it is sufficiently effective in terms of quality. When this is not the case, a conventional estimation of the other part(s) of the depth image takes over.

According to another aspect of the invention, the method comprises obtaining an identifier of the reference texture image from an item of information encoded in the data stream and obtaining the reference depth image from said identifier.

In this way, it is possible to find the reference depth image associated with the same view as this reference texture image for motion-compensating a depth image associated with the current view.

The invention also relates to a device for constructing a depth image associated with a view of a multiview video, called current view, from a data stream representative of said video, said stream comprising encoded information representative of the motion vectors of a texture image associated with said current view with respect to at least one reference texture image, said texture image having been divided into blocks.

Said device is configured to implement:

obtaining said motion vectors from the information encoded in the stream;

when at least one motion vector has been obtained for at least one block, called current block of the texture image, motion-compensating a block of the depth image, co-located with the current block, from said at least one motion vector and at least one available reference depth image, said reference depth image being associated with the same view as said reference texture image.

Advantageously, said device is configured to implement the steps of the construction method as described previously, in its various embodiments. The construction device presents a combination of all or some of the features set out throughout this document.

Correlatively, the invention also relates to a method for decoding a data stream representative of a multiview video, said stream comprising encoded information representative of motion vectors of a texture image of a current view with respect to a reference texture image, said texture image having been divided into blocks, said method comprising:

decoding the encoded information representative of the motion vectors of a texture image associated with said current view; and transmitting said information to a device for constructing a depth image associated with the current view, said device being configured to implement:

obtaining said motion vectors from said information;

when at least one motion vector has been obtained for at least one block, called current block of the texture image, motion-compensating a block of the depth image, co-located with the current block, from said at least one motion vector and at least one available reference depth image, said reference depth image being associated with the same view as said reference texture image.

According to a variant, the invention also relates to a method for decoding a data stream representative of a multiview video, said stream comprising encoded information representative of motion vectors of a texture image of a current view with respect to a reference texture image, said texture image having been divided into blocks, said method comprising:

decoding the encoded information representative of the motion vectors of a texture image associated with said current view; and constructing at least one block of a depth image associated with the current view at least from the motion vectors decoded according to the above-mentioned construction method.

Advantageously, the decoding method comprises the features of the above-mentioned construction method.

According to another aspect, the decoding method further comprises decoding an encoded item of information representative of a motion compensation flag of said at least one block of said depth image, said construction being implemented for said block when the flag is set to a predetermined value.

The invention also relates to a device for decoding a data stream representative of a multiview video, said stream comprising a current view with respect to a reference texture image, said texture image having been divided into blocks, said device being configured to implement:

decoding the encoded information representative of the motion vectors of a texture image associated with said current view; and transmitting said information to the device for constructing a depth image associated with the above-mentioned current view.

Advantageously, said device is configured to implement the steps of the decoding method as described previously, in its various embodiments.

According to a variant, the construction device is itself integrated into the decoding device.

Advantageously, the above-mentioned construction and decoding devices are integrated into a system for free navigation in a multi-view video of a scene.

According to the invention, said system further comprises a module for synthesising a view according to a viewpoint chosen by a user from the decoded texture images and the constructed depth images.

Advantageously, the above-mentioned free navigation system is integrated into a terminal equipment configured to receive an encoded data stream representative of a multiview video.

The terminal equipment and the free navigation system have at least the same advantages as those provided by the above-mentioned construction and decoding methods.

Correlatively, the invention also relates to a method for encoding a data stream representative of a multi-view video and comprising:

determining motion vectors of a texture image associated with a view of the multiview video, called current view, with respect to a reference texture image, said texture image having been divided into blocks;

encoding said motion vectors in the data stream;

obtaining a depth image associated with said current view, captured by a depth camera, called captured depth image;

when at least one motion vector has been obtained for at least one block of the texture image, motion-compensating at least one block of a depth image associated with the current view, called constructed depth image, said block being co-located with said block of the texture image, from said at least one motion vector and at least one available reference depth image, said reference depth image being associated with the same view as said reference texture image;

evaluating a motion-compensated block of said reconstructed depth image by comparison with the co-located block of the captured depth image, a compensation error being obtained; and encoding an item of information representative of a motion compensation flag of said at least one block of said depth image depending on a predetermined error criterion, said flag being set to a predetermined value when the error criterion is satisfied.

The invention also relates to a device for encoding a data stream representative of a multiview video and configured to implement:

determining motion vectors of a texture image associated with a view of the multiview video, called current view, with respect to a reference texture image, said texture image having been divided into blocks;

encoding said motion vectors in the data stream;

obtaining a depth image associated with said current view, captured by a depth camera, called captured depth image;

when at least one motion vector has been obtained for at least one block of the texture image, motion-compensating at least one block of a depth image associated with the current view, called constructed depth image, said block being co-located with said block of the texture image, from said at least one motion vector and at least one available reference depth image, said reference depth image being associated with the same view as said reference texture image;

evaluating a motion-compensated block of said reconstructed depth image by comparison with the co-located block of the captured depth image, a compensation error being obtained; and encoding an item of information representative of a motion compensation flag of said at least one block of said depth image depending on a predetermined error criterion, said flag being set to a predetermined value when the error criterion is satisfied.

Advantageously, said device is configured to implement the steps of the encoding method as described previously in its various embodiments.

Correlatively, the invention also relates to a signal carrying an encoded data stream representative of a multiview video, said stream comprising encoded data representative of motion vectors of a texture image of a current view with respect to a reference texture image, said texture image having been divided into blocks. According to the invention, said stream comprises encoded data representative of a motion compensation flag, said flag being associated with said at least one block of a depth image associated with said current view and said flag is intended, when it is set to a predetermined value, to be used to implement motion compensation of said block of the depth image, from at least one decoded motion vector and at least one available reference depth image, said reference depth image being associated with the same view as said reference texture image.

The invention also relates to computer program products comprising program code instructions for implementing the methods as described previously, when they are executed by a processor.

A program can use any programming language, and can be in the form of source code, object code, or intermediate code between source code and object code, such as in a partially compiled form, or in any other desirable form.

The invention also relates to a computer-readable storage medium on which are saved computer programs comprising program code instructions for implementing the steps of the methods according to the invention as described above.

Such a storage medium can be any entity or device able to store the program. For example, the medium can comprise a storage means, such as a ROM, for example a CD-ROM or a microelectronic circuit ROM, or a magnetic recording means, for example a mobile medium (memory card) or a hard disk or SSD.

On the other hand, such a storage medium can be a transmissible medium such as an electrical or optical signal, that can be carried via an electrical or optical cable, by radio or by other means, so that the computer program contained therein can be executed remotely. The program according to the invention can be downloaded in particular on a network, for example the Internet network.

Alternatively, the storage medium can be an integrated circuit in which the program is embedded, the circuit being adapted to execute or to be used in the execution of the above-mentioned construction, encoding and/or decoding methods.

According to one embodiment, the present technique is implemented using software and/or hardware components. In this context, the term "module" may be used in this document to refer to a software component, a hardware component or a combination of hardware and software components.

A software component is one or more computer programs, one or more subroutines of a program, or more generally any element of a program or software capable of implementing a function or set of functions, as described below for the module concerned. Such a software component is executed by a data processor of a physical entity (terminal, server, gateway, set-top-box, router, etc.) and is able to access the hardware resources of this physical entity (memories, recording media, communication buses, electronic input/output cards, user interfaces, etc.). Hereafter, resources are understood to be any set of hardware and/or software elements that support a function or a service, whether individually or in combination.

In the same way, a hardware component is any element of a hardware assembly capable of implementing a function or set of functions, as described below for the module concerned. It may be a programmable hardware component or a component with an embedded processor for executing software, for example, an integrated circuit, a smart card, a memory card, an electronic card for executing firmware, etc.

Each component of the system described above naturally implements its own software modules.

The various embodiments mentioned above can be combined with each other for the implementation of the present technique.

BRIEF DESCRIPTION OF THE FIGURES

Other purposes, features and advantages of the invention will become more apparent upon reading the following description, hereby given to serve as an illustrative and non-restrictive example, in relation to the figures, among which:

FIG. 10: describes an example of the hardware structure of a device for constructing a depth image according to the invention;

FIG. 11: describes an example of the hardware structure of a device for decoding a multiview video according to the invention; and FIG. 12: describes an example of the hardware structure of a device for encoding a multiview video according to the invention.

DETAILED DESCRIPTION OF THE INVENTION

The principle of the invention is based on decoding motion vectors of a texture image associated with a current view of a multiview video with respect to a reference texture image and on constructing at least one block of a depth image associated with said current view, by motion-compensating this block from the decoded motion vector for a co-located block of the texture image and an available reference depth image (decoded conventionally or constructed according to the invention), said reference depth image being associated with the same view as said reference texture image.

The invention has a particular application in a system for free navigation within a multiview video, for example embedded in an item of terminal equipment, such as a mobile phone or a head-mounted display. Indeed, in such a system, the depth images associated with the views are used in conjunction with the decoded texture images to synthesise the view desired by the user.

Figure 5:
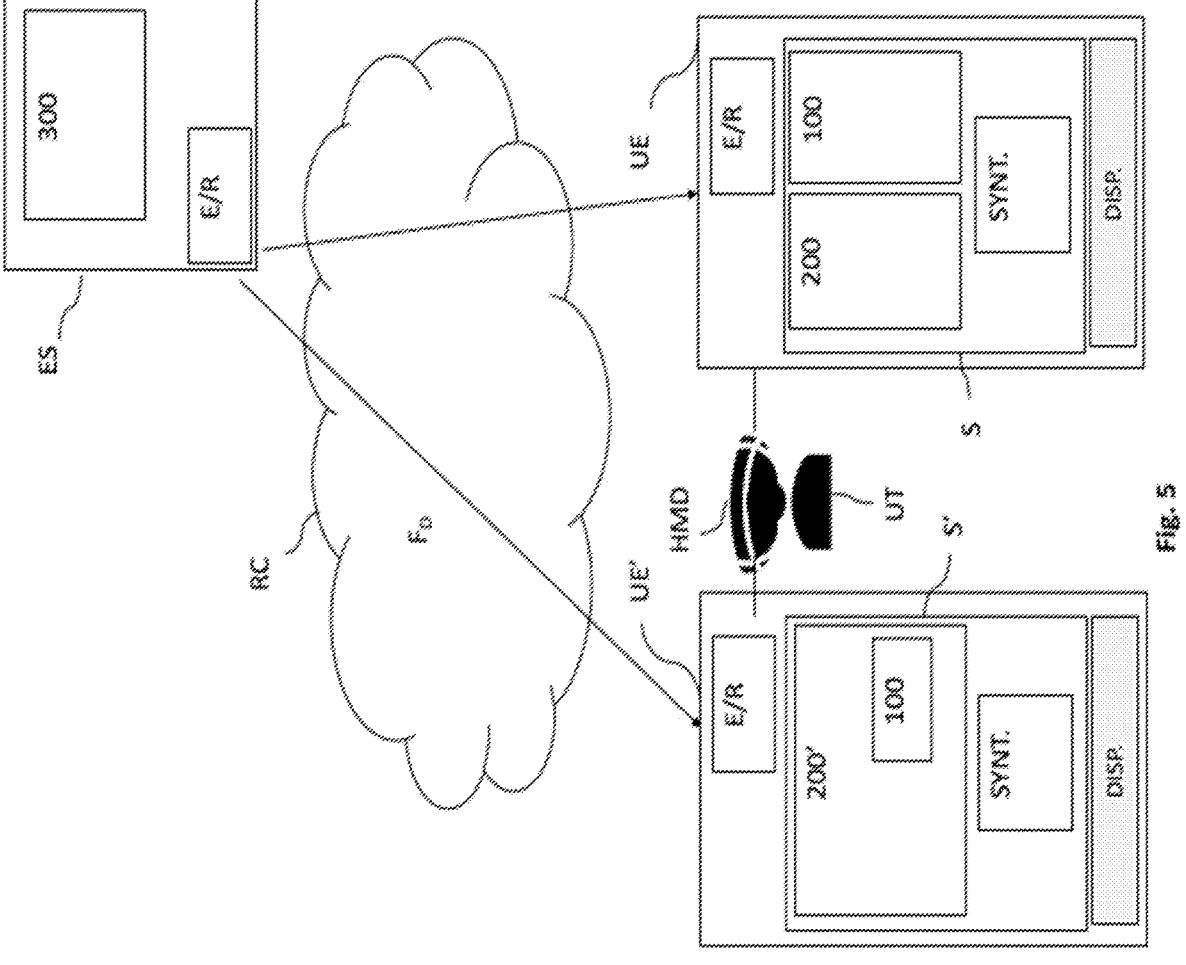
FIG. 5: diagrammatically illustrates an example of the architecture of an item of terminal equipment comprising a system for free navigation in a multiview video comprising a device for decoding an encoded data stream representative of a multiview video and a device for constructing a depth image associated with a view of said video according to one embodiment of the invention.

In relation to FIG. 5, an example of the architecture of an item of terminal equipment UE, UE' comprising a head-mounted display HMD according to one embodiment of the invention is presented. Such an item of terminal equipment is configured to receive and process an encoded data stream $F_D$ representative of a multiview video of a scene as well as to display on a display device DISP, for example the screen of the headset HMD, any view of the scene chosen by the user UT.

To do this, the item of terminal equipment UE, UE' integrates a system S, S' for free navigation in the multiview video of the scene according to the invention. According to a first example, the item of terminal equipment UE comprises a device 100 for constructing a depth image associated with the current view, a device 200, 200' for decoding an encoded data stream representative of the multiview video and a module SYNT for synthesising a view chosen by the user. The device 100 is configured to obtain from the data stream $F_D$ motion vectors of a texture image associated with the current view with respect to at least one reference texture image, and to motion compensate at least one block of the depth image from at least one decoded motion vector and at least one reference depth image already constructed, said reference depth image being associated with the same view as said reference texture image.

Figure 7:
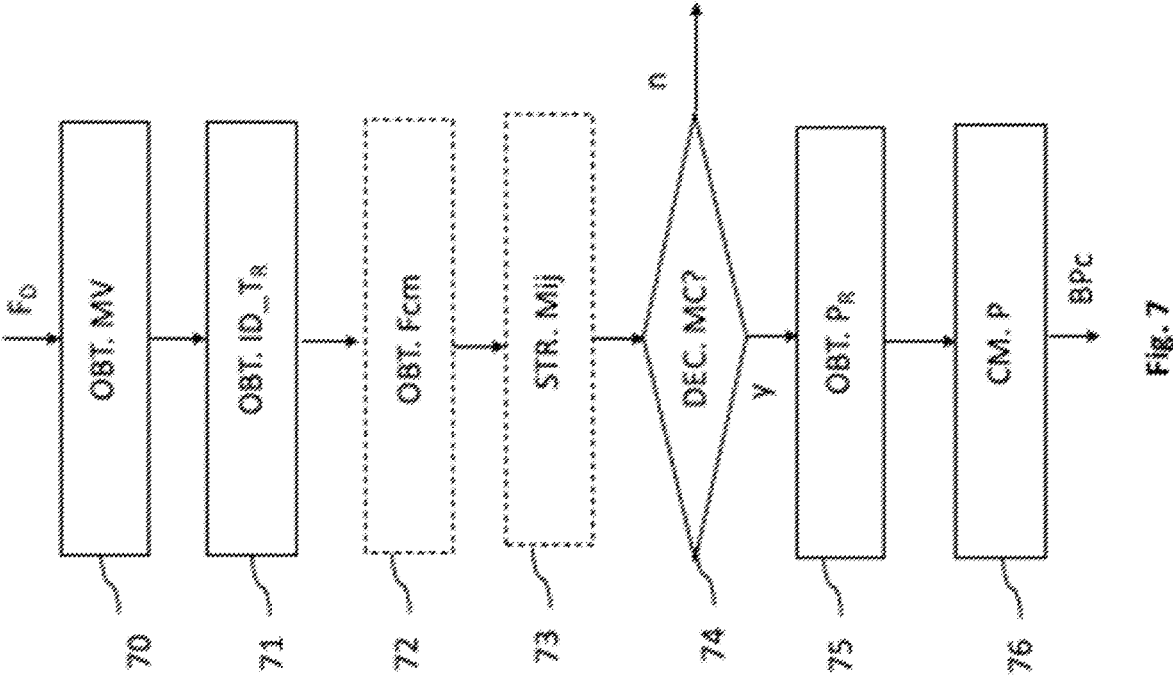
FIG. 7: describes in the form of a flowchart the steps of a method for constructing a depth image of a view of a multiview video according to one embodiment of the invention.

The device 100 thus implements the method for constructing a depth image according to the invention that will be detailed hereafter in relation to FIG. 7.

The device 200, 200' for decoding the encoded data stream $F_D$ representative of the multiview video is configured to decode encoded information representative of the motion vectors of the texture image associated with said current view and to transmit at least said decoded information to the above-mentioned construction device 100.

Figure 6:
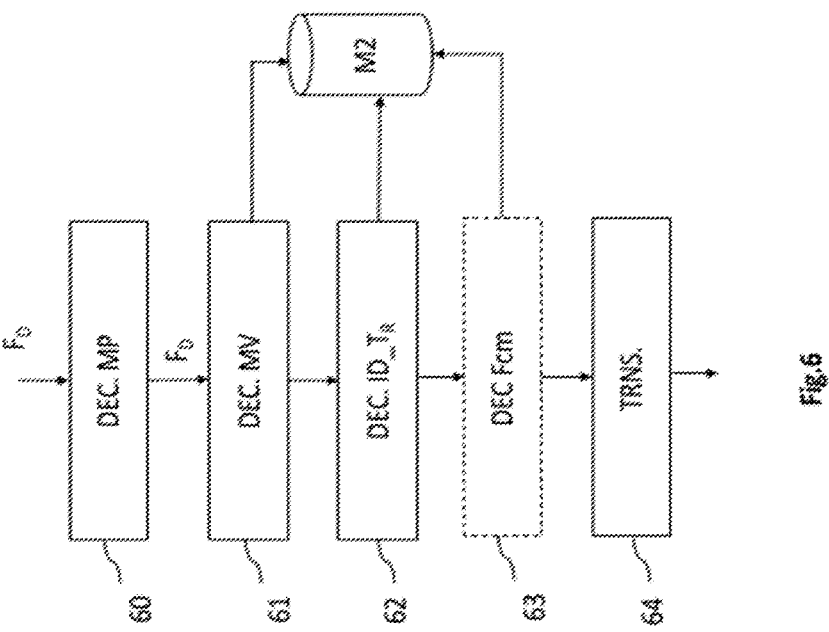
FIG. 6: describes in the form of a flowchart the steps of a method for decoding an encoded data stream representative of a multiview video, according to one embodiment of the invention.

The device 200, 200' thus implements the method for decoding an encoded data stream representative of a multiview video according to the invention that will be detailed hereafter in relation to FIG. 6. The data stream $F_D$ has been encoded by an encoding device 300, for example integrated into a remote item of server equipment ES that has transmitted it via its transmission-reception module E/R to that of the item of terminal equipment UE or UE' via a communication network RC.

The synthesis module SYNT is configured to generate the view chosen by the user from the decoded texture images and the constructed depth images, when it does not correspond to any of the views of the multiview video transmitted in the data stream $F_D$.

According to a second embodiment of the invention, the item of terminal equipment UE' is considered, which integrates a system S' for free navigation in the multiview video comprising the device 200' for decoding an encoded data stream and a synthesis module SYNT. According to this variant, the device 200' integrates the above-mentioned device 100.

According to one embodiment of the invention, the encoding device 300 is configured to encode information representative of motion vectors of a texture image of a current view with respect to a reference texture image, obtain a depth image associated with said current view, captured by a depth camera, called captured depth image, motion compensate at least one block of a depth image associated with the current view, called constructed depth image, from at least one decoded motion vector and at least one reference depth image already constructed, said reference depth image being associated with the same view as said reference texture image, evaluate said constructed depth image by comparison with the captured depth image, a compensation error being obtained; and encode an item of information representative of a motion compensation flag of said at least one element of said depth image depending on a predetermined error criterion, said flag being set to a first value when the error criterion is satisfied.

Figure 8:
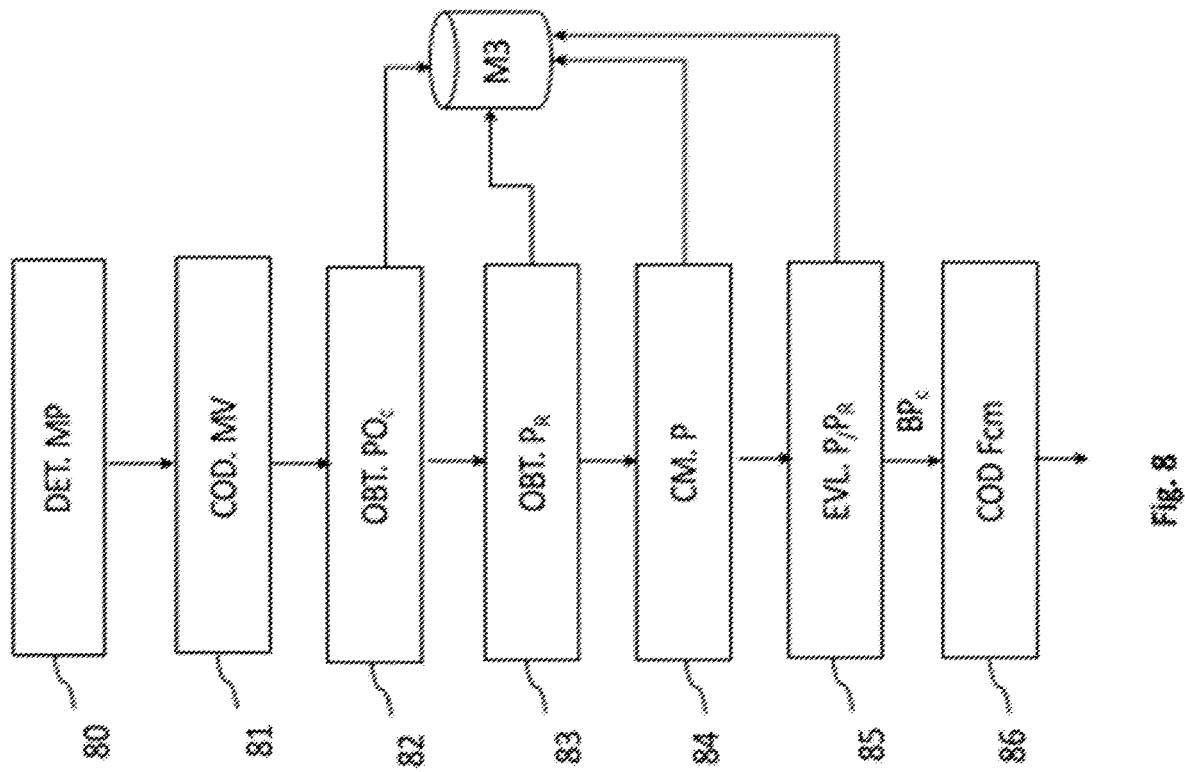
FIG. 8: illustrates in the form of a flowchart the steps of a method for encoding an encoded data stream representative of a multi-view video according to one embodiment of the invention.

The device 300 thus implements the encoding method according to the invention that will be detailed hereafter in relation to FIG. 8.

In the following, an encoded data stream $F_D$ representative of a multiview video VMV, received by the item of terminal equipment UE of FIG. 5, is considered.

In the following, an image is conventionally designated as an array of pixels, usually rectangular. Such an image can associate a texture value or a depth value with each pixel of the array.

View designates the image(s) acquired by a camera from a particular viewpoint of the scene. A view can be represented by a texture image and/or a depth image, which form the components of this view.

Figure 1:
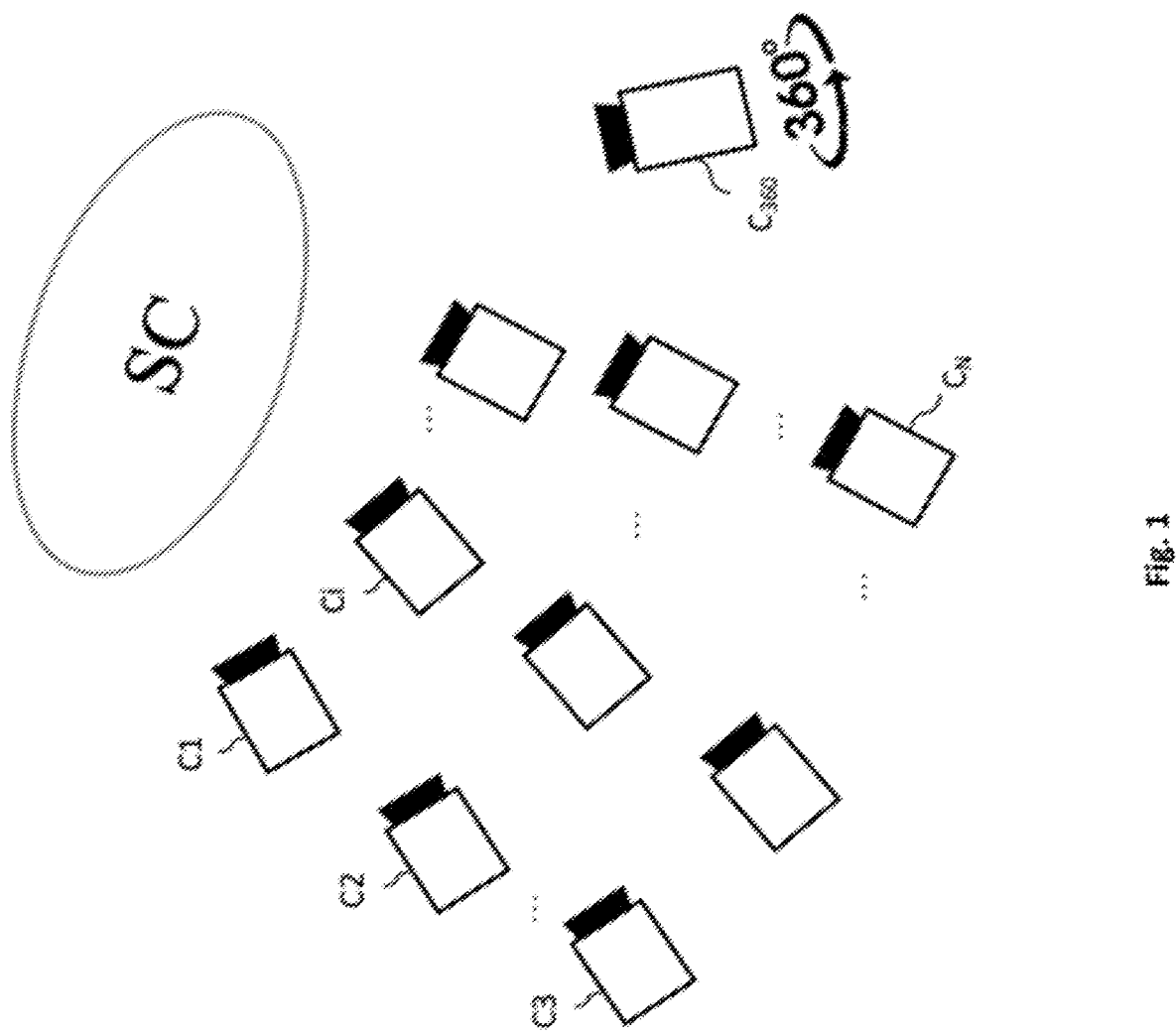
FIG. 1: shows an example of the arrangement of a plurality of cameras forming a system for acquiring a multiview video of a scene, according to the prior art.
Figure 3:
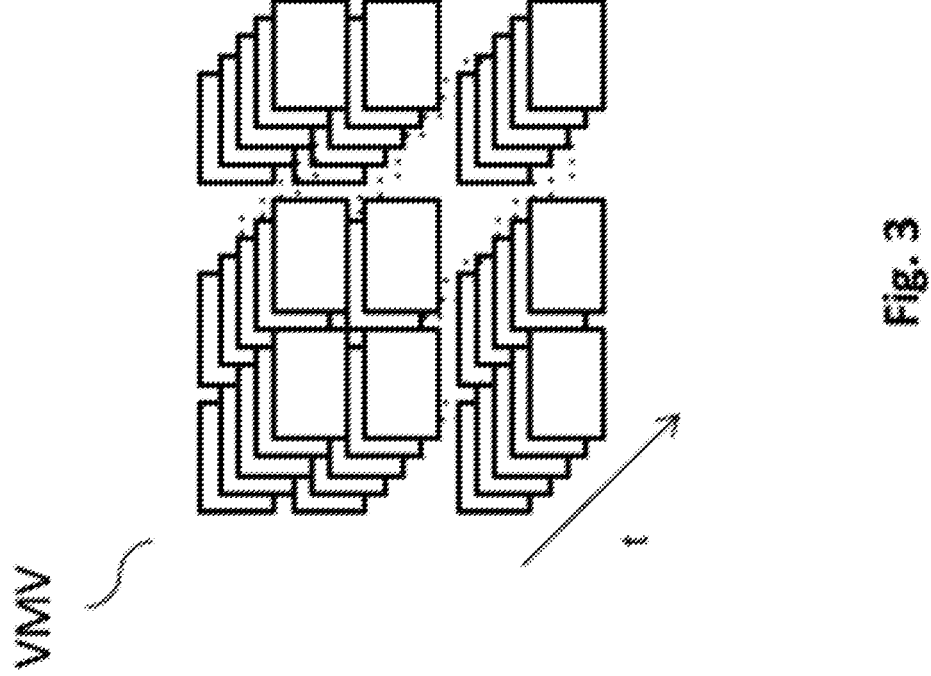
FIG. 3: diagrammatically illustrates a sequence of the plurality of images, captured by the plurality of cameras at several successive times, forming the original multiview video, according to the prior art.
Figure 2:
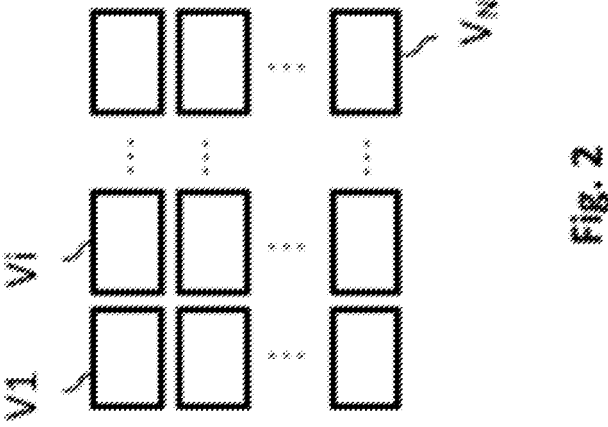
FIG. 2: diagrammatically illustrates a plurality of images of the scene, captured by the plurality of cameras at a given time, according to the prior art.
Figure 4:
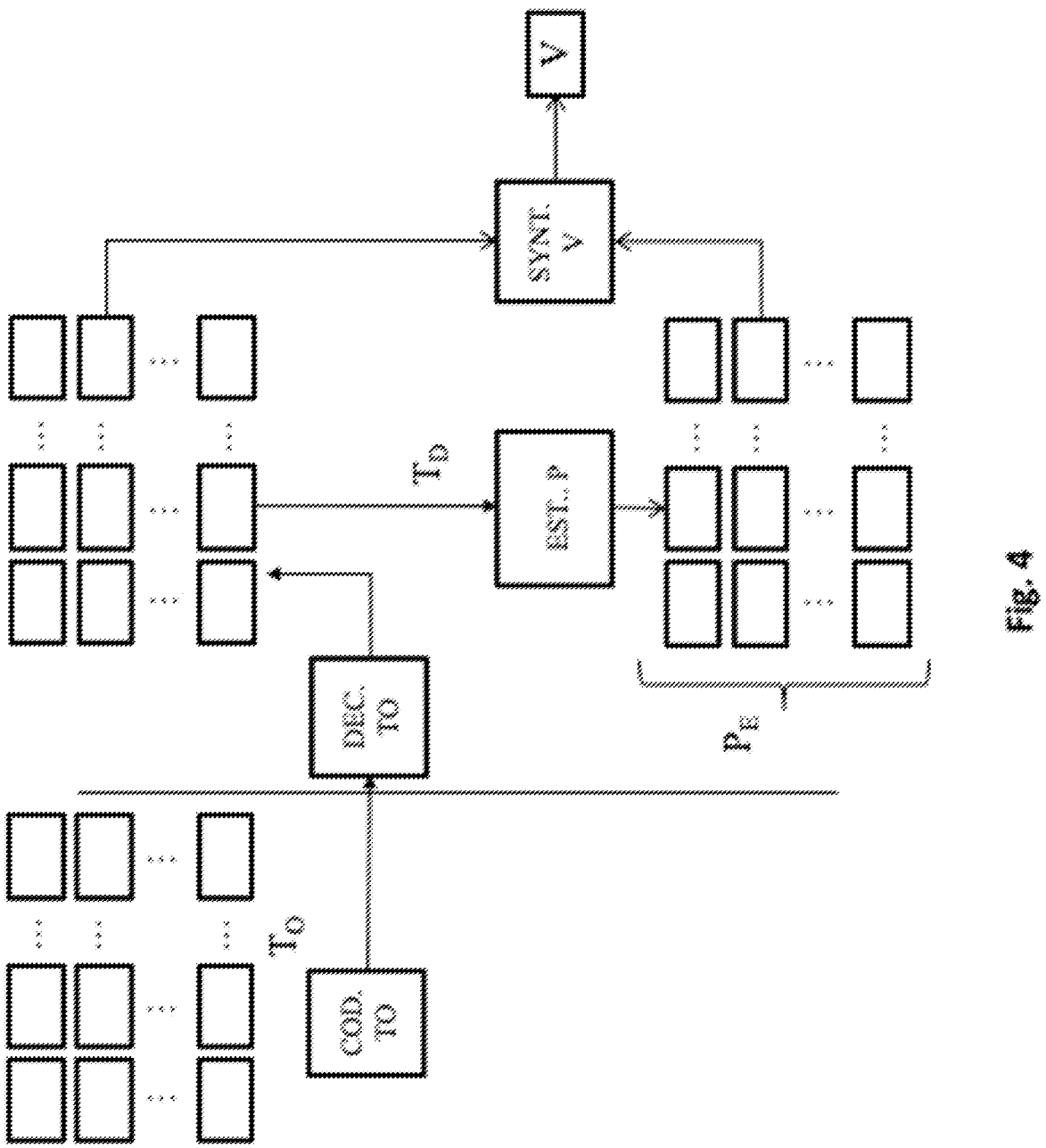
FIG. 4: diagrammatically illustrates an example of the processing of an encoded data stream representative of a multiview video by an item of terminal equipment according to the prior art.

In the following, the case of a multiview video of a scene SC acquired by a set of cameras such as the one of FIG. 1 is considered. A conventional video encoder compliant with an encoding standard, such as HEVC for example, and configured to produce an encoded data stream $F_D$ representative of multiview video, is considered. In particular, it is assumed that this encoding is performed according to the above-mentioned "Geometry Absent" profile. In other words, only the texture component TO of each view V of the multiview video is encoded in the data stream $F_D$. For encoding, the texture component TO is conventionally divided into blocks of pixels, for example of dimensions 16×16, 8×8, 4×4 or other, and the encoding is performed block by block, in the conventional manner. Of course, the invention is not limited to this particular case and also applies to another division or to encoding per pixel.

During this encoding, the encoder chooses, in a manner known per se, for each block of a current texture image, whether it will be encoded according to an INTER mode, that is by motion compensation (in which case a reference image and at least one motion vector are signaled in the encoded data stream) or according to an INTRA mode or any other mode that does not comprise a motion vector.

For each block of the current texture image, the motion vector(s) is/are encoded in the data stream $F_D$ along with an identifier of the reference texture image $ID\_T_R$.

An item of terminal equipment UE, UE' and a device 200, 200' for decoding an encoded data stream $F_D$ received by this item of terminal equipment are now considered.

In relation to FIG. 6, an embodiment of a method for decoding the data stream $F_D$ according to one embodiment of the invention is now presented in the form of a flowchart. Advantageously, this method is implemented by the above-mentioned device 200 or 200'.

A current view Vc and a current block Bc of the texture image TOc associated with this view Vc are considered.

For each block Bc, an encoding, for example of the HEVC type, is performed. It comprises in 60 reading and decoding syntax elements comprised in the information of the stream $F_D$.

Typically, these syntax elements comprise a prediction mode MP used for the current block Bc. This mode can be INTER, INTRA or other. It can be deduced from this item of prediction mode information whether a motion vector MV is encoded in the stream $F_D$.

It is assumed, for example, that the prediction mode MP is INTER. In 61, the motion vector MV associated with the current block Bc is decoded. This motion vector is representative of a motion of the current texture image TOc with respect to a reference image $T_R$.

In 62, an item of information representative of an identifier $ID\_T_R$ of this reference texture image is decoded.

Advantageously, this information relating to the motion vector MV and the identifier of the reference texture image is stored in a memory M2 and then transmitted in 64 to the device 100 for constructing a depth image associated with the current view Vc according to the invention. This device 100 may or may not be integrated into the decoding device 200, 200', as shown in FIG. 5, already described.

Optionally, a motion compensation flag Fcm is decoded in 63. It can take at least one first value V1, for example equal to 1, to indicate that a motion compensation of the depth image Pc should be implemented, or a second value V2, for example equal to zero, to indicate on the contrary that no motion compensation should be implemented. This flag, when decoded, is then transmitted in 64 to the device 100 according to the invention.

In relation to FIG. 7, an embodiment of a method for constructing a depth image of a current view according to one embodiment of the invention is now presented in the form of a flowchart. Advantageously, this method is implemented by the above-mentioned device 100.

As no depth information has been transmitted in the data stream $F_D$ for the current view Vc, it needs to be constructed. The method according to the invention is described for the current block:

In 70, the motion vector MV of the current block Bc is obtained. For example, it is received from the decoding device 200 or 200'. In 71, the identifier $ID\_T_R$ of the reference texture image used to estimate said motion vector MV is obtained. For example, it is received from the decoding device 200 or 200'. This reference texture image is associated with a view $V_R$. Optionally, in 72, a motion compensation flag Fcm is obtained and stored in memory M1. For example, it is encoded in the stream $F_D$ and received from the decoding device 200 or 200'. It is set to a first predetermined value, for example equal to 1, to indicate that the depth block BPc co-located with the current texture block Bc should be motion-compensated, and to a second predetermined value, for example equal to 0, to indicate on the contrary that the depth block BPc should not be motion-compensated.

Optionally, in 73, an information field Mij is populated based on the information previously obtained. It is for example set to 1 when a motion vector MV has been obtained for the current block and when the flag Fcm is received with the first predetermined value.

In 74, it is decided based on the information received whether the current depth block BPc is motion-compensated. Such a decision is made based on whether or not a motion vector MV has been obtained for the current texture block Bc or, when the flag Fcm has been received, based on the value of the flag Fcm, or yet in the embodiment where the information field Mij is used, based on the value of Mij.

In 75, a reference depth image $P_R$ is obtained from the identifier $ID\_T_R$. This is a depth image previously constructed by the device 100 according to the invention and in particular the one associated with the same view $V_R$ as the reference texture image $T_R$.

In 76, the current BPc block of the depth image Pc is constructed by motion compensation CM of the block of the reference depth image $P_R$ pointed to by the motion vector MV.

The steps just described are repeated for the next blocks of the depth image, right up to the last one.

In this respect, it should be noted that two operating modes are possible. According to a first mode, called on the fly, the device 100 constructs the depth image Pc of the current view Vc block by block, as it obtains the decoded information of the data stream $F_D$ from the device 200 or 200'. According to a second embodiment of the invention, it waits until all decoded information is received before constructing the current depth image P.

In relation to FIG. 8, an embodiment of a method for encoding a depth image of a current view according to one embodiment of the invention is now presented in the form of a flowchart. Advantageously, this method is implemented by the above-mentioned device 300.

According to this embodiment of the invention, it is assumed that the original depth images PO of the views of the multiview video have been captured, but that they are not encoded in the data stream $F_D$.

A current view Vc and the encoding of its original texture image TOc at a given time t are considered in particular.

As previously, it is assumed that this image is divided into blocks and that the image blocks are scanned in a predetermined scanning order, for example a zigzag mode (that corresponds to the lexicographic order).

Encoding of the current block Bc of the texture image TOc associated with the current view Vc is detailed.

In 80, the prediction mode MP to be used for this current block is determined. In other words, the encoding device chooses whether the current block of the image will be encoded in INTER mode, by motion compensation (in which case a reference texture image $T_R$ and a motion vector MV are signaled in the encoded data stream $F_D$) or in intra mode or any other mode that does not comprise any motion vector.

It is assumed in the following that the prediction mode MP chosen for the current block Bc is a mode for which a motion vector MV is calculated.

In 81, the motion vector MV of the current block is calculated with respect to a reference texture image $T_R$. It is associated with a view $V_R$. In 81, the motion vector is encoded and the encoded item of information obtained is inserted into an encoded data stream $F_D$.

In 82, an original depth image POc is captured by a depth camera associated with the camera arranged to capture the texture image TOc of the current view Vc.

In 83, a depth image previously constructed, called reference depth image $P_R$, and associated with the same view $V_R$ as the reference texture image $T_R$ is obtained, for example, from a memory M3.

In 84, a block BPc corresponding to the current block Bc in a depth image Pc associated with the current view Vc is constructed by motion compensation of the block of the reference depth image $P_R$ pointed to by the motion vector MV.

In other words, according to this embodiment of the invention, if the current texture block is encoded by motion compensation, the encoding device performs an identical motion compensation of the depth block co-located in the depth image associated with the same view Vc.

Thus, if the current texture block BTOc, of coordinates (i,j) in the texture image TOc at the time t is motion-compensated by a block of the reference image $T_R$ at the time t', with a motion vector of components (MVx,MVy), then the encoding device performs in 84 a motion compensation of the depth block BPc, of coordinates (i,j) of the current depth image Pc using the depth block $BP_R$ of the depth image $P_R$ associated with the reference texture image $TO_R$ at the time t', with the motion vector of components (MVx,MVy). In this way, the same motion compensation is applied to the current depth block BPc as to the co-located texture block associated with the same current view Vc, and a compensated depth block is thus obtained.

In 85, the compensated block BPc is evaluated by comparison with the co-located block in i,j of the original depth image POc. For example, an amount of energy of a residue between the actually captured depth image POc and the motion-compensated depth image PCc is calculated.

In 86, a motion compensation flag Fcm is determined based on a positioning of this amount of energy with respect to a predetermined threshold. Advantageously, if it is below the threshold, the flag is set to the first value, for example equal to 1, to indicate that the current block is motion-compensated for its depth component. Otherwise, the flag is set to a second value, for example equal to 0, which means that the current block is not motion-compensated for its depth component. The flag Fcm is then encoded in the stream $F_D$.

It should be noted that the depth flag Fcm is not transmitted for a depth block associated with a texture block that has no motion vector (for example, because it is encoded according to the intra mode).

The steps just described are repeated for each of the blocks of the texture image of the current view.

Once encoded, the data stream $F_D$ obtained is stored in memory M3, for example, or transmitted in a signal to one or more items of terminal equipment via the communication network RC.

Figure 9:
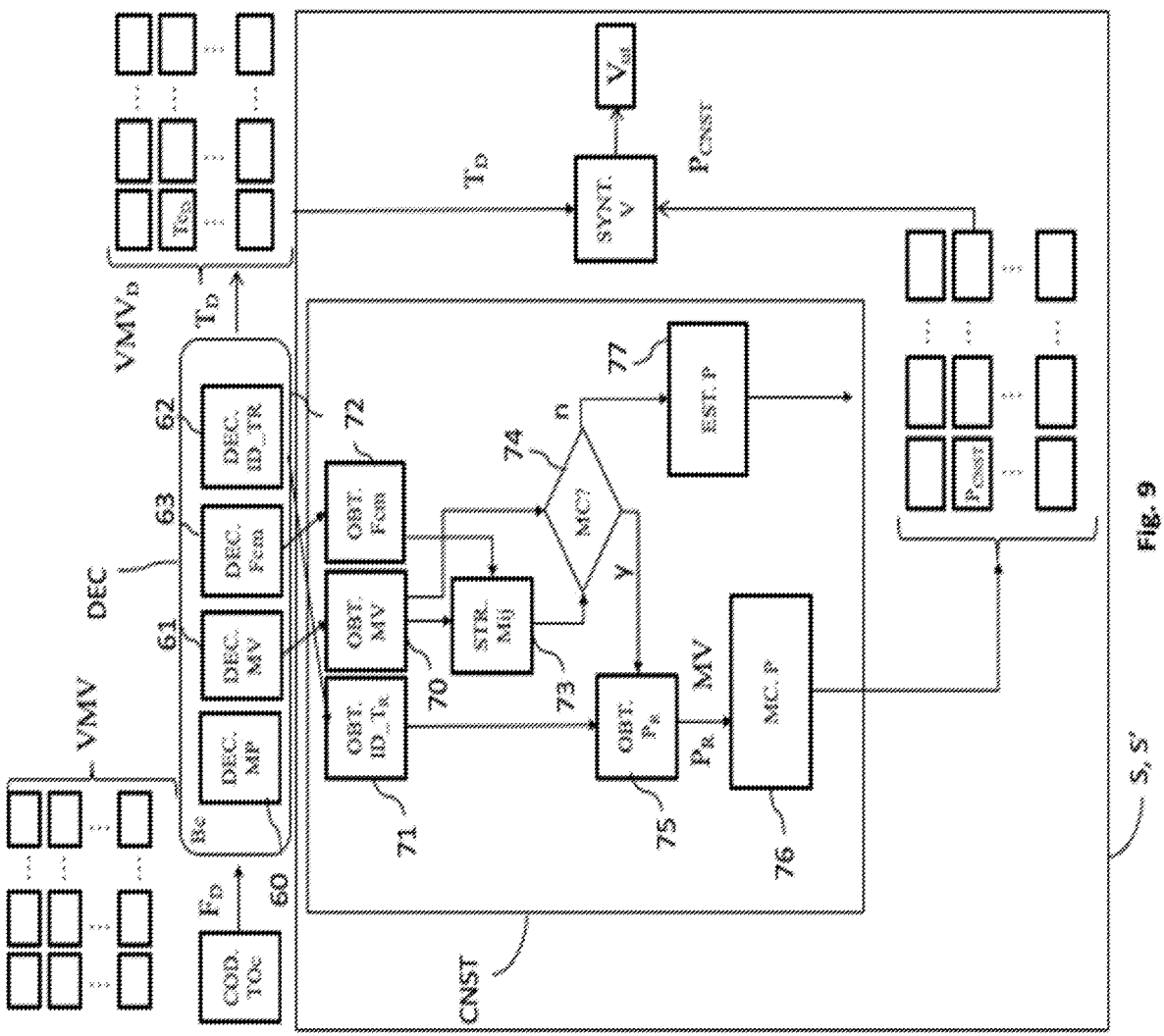
FIG. 9 details an embodiment of the above-mentioned methods according to one embodiment of the invention.

In relation to FIG. 9, an example of the decoding of a data stream representative of a multi-view video and of the construction of a depth image of a current view Vc of this video according to one embodiment of the invention is now detailed.

A data stream $F_D$ is obtained. For example, it is received by the decoding device 200 via the communication network RC. It is assumed that the depth image associated with the same current view Vc is not encoded in the stream $F_D$.

The block DEC for decoding the current texture image Tc and information relating to the processing of the current depth image Pc is described in detail first. It is assumed that the current texture image Tc is for example divided into blocks. The blocks of this image are processed in a predetermined order, for example in zigzag mode, that corresponds to the lexicographic order. For a current block Bc of the current texture image TOc, the information encoded in the data stream $F_D$ is read in 60-63. In particular, the prediction mode MP of this block, if applicable the motion vector MV and an identifier $ID\_T_R$ of the reference texture image are obtained. According to one embodiment of the invention, a motion compensation flag Fcm for the block co-located in the depth image Pc is read.

The current block Bc of the current texture image Tc is decoded.

The block CNST for constructing the co-located block of the current depth image Pc is now considered.

According to a first case, in 70, a motion vector MV of the current texture block is obtained, as well as in 71, an identifier $ID\_T_R$ of the reference texture image. In 74, an information field Mij is set to a first value indicating that the current depth block should be motion-compensated. The motion vector and the identifier of the reference texture image are stored in memory.

According to a second case, no motion vector MV of the current texture block is obtained, as well as no reference texture image identifier. In 74, the information field Mij is set to a second value indicating that the current depth block should not be motion-compensated.

Optionally, a motion compensation identifier Fcm is thus obtained in 72 and stored in memory. As previously described, according to a particular embodiment, it has advantageously been set by the encoding device according to the invention to a first or a second value, depending on a performance criterion for the motion compensation of the depth block evaluated with respect to an original depth image captured by a depth camera, but not transmitted.

In 73, a decision is made whether or not to implement a motion compensation of the current depth block based on the information previously obtained. It should be noted that the flag Fcm prevails, that is, when it has been obtained, the decision is made based on its value. In other words, if the flag is set to the first value, it is decided to motion-compensate the current depth block. Otherwise, the decision depends on the presence or not of a motion vector for the co-located texture block associated with the current view.

When it has been decided to compensate the current depth block, a reference depth image $P_R$ is obtained in 75 from the identifier $ID\_T_R$ of the reference texture image. It is the depth image associated with the same view as the reference texture image $T_R$.

In 76, the current depth block BPc is motion-compensated according to a conventional motion compensation technique, from the block of the reference depth image co-located with the one pointed to by the motion vector in the reference texture image $T_R$. When, on the other hand, it has been decided not to motion-compensate the current depth block BPc, a conventional estimation is implemented in 77 using, for example, one of the DERS, IVDE or GANet techniques previously mentioned.

The operations described are repeated for each of the blocks of the current texture image Tc, then of the current depth image Pc of the current view, then the next view is processed, etc.

The decoded texture images $T_D$ and the constructed depth images $P_{CNST}$ are then advantageously used by a synthesis module to generate, for example according to a DIBR technique, the view chosen by the user UT of the system for rendering a multiview video according to the invention, for example depending on their viewpoint of the scene.

In relation to FIG. 10, an example of the hardware structure of a device 100 for constructing a depth image of a current view of a multiview video, comprising at least one module for obtaining motion vectors of a texture image associated with the current view, from an encoded data stream representative of the multiview video, and a module for motion-compensating at least one element of said depth image, configured to be implemented when at least one motion vector has been obtained for said at least one element, is now presented.

Advantageously, the device 100 further comprises obtaining a motion compensation flag from an item of information encoded in the stream, said flag being associated with at least one element of the depth image and a decision module for implementing said motion compensation when the flag is set to a first value.

Advantageously, it also comprises a module for obtaining an identifier of the reference texture image and a module for obtaining the reference depth image P$_R$ from said identifier.

The term "module" can correspond to a software component as well as to a hardware component or a set of hardware and software components, a software component itself corresponding to one or more computer programs or subprograms, or more generally, to any element of a program capable of implementing a function or set of functions.

More generally, such a device 100 comprises a random access memory 103 (for example, a RAM memory), a processing unit 102 equipped for example with a processor and controlled by a computer program Pg1, representative of the obtaining, decision and motion compensation modules, stored in a read-only memory 101 (for example, a ROM memory or hard disk). At initialisation, the code instructions of the computer program are for example loaded into a random access memory 103 before being executed by the processor of the processing unit 102. The random access memory 103 can also contain the motion vector, the reference texture image identifier, the motion compensation flag, etc.

FIG. 10 only shows a particular one of several possible ways of realising the device 100, so that it executes the steps of the method for constructing a depth image as detailed above, in relation to FIGS. 7 and 9 in its various embodiments. Indeed, these steps may be implemented indifferently on a reprogrammable computing machine (a PC computer, a DSP processor or a microcontroller) executing a program comprising a sequence of instructions, or on a dedicated computing machine (for example a set of logic gates such as an FPGA or an ASIC, or any other hardware module).

In the case where the device 100 is realised with a reprogrammable computing machine, the corresponding program (that is the sequence of instructions) can be stored in a removable (such as, for example, an SD card, a USB flash drive, CD-ROM or DVD-ROM) or non-removable storage medium, this storage medium being partially or totally readable by a computer or a processor.

The various embodiments have been described above in relation to a device 100 integrated into an item of terminal equipment, for example, a mobile phone or a head-mounted device.

In relation to FIG. 11, an example of the hardware structure of a device 200, 200' for decoding an encoded data stream according to the invention, comprising at least one module for decoding encoded information representative of the motion vectors of a texture image associated with said current view, a module for transmitting said information to a device 100 mentioned above for constructing a depth image associated with the current view.

Advantageously, the device 200, 200' comprises a module for decoding encoded information representative of an identifier of a reference texture image associated with the motion vectors and a module for decoding a motion compensation flag for at least one element of the depth image.

Alternatively, the transmission module is replaced by the above-mentioned device 100. In other words, the device 100 is integrated into the device 200' and connected to its decoding module.

The term "module" can correspond to a software component as well as to a hardware component or a set of hardware and software components, a software component itself corresponding to one or more computer programs or subprograms, or more generally, to any element of a program capable of implementing a function or set of functions.

More generally, such a device 200, 200' comprises a random access memory 203 (for example, a RAM memory), a processing unit 202 equipped for example with a processor and controlled by a computer program Pg2, representative of the decoding and transmission modules stored in a read-only memory 201 (for example, a ROM memory or hard disk). At initialisation, the code instructions of the computer program are for example loaded into a random access memory 203 before being executed by the processor of the processing unit 202. The random access memory 203 can also contain the decoded information.

FIG. 11 only shows a particular one of several possible ways of realising the device 200, 200', so that it executes the steps of the decoding method as detailed above, in relation to FIGS. 6 and 9 in its various embodiments. Indeed, these steps may be implemented indifferently on a reprogrammable computing machine (a PC computer, a DSP processor or a microcontroller) executing a program comprising a sequence of instructions, or on a dedicated computing machine (for example a set of logic gates such as an FPGA or an ASIC, or any other hardware module).

In the case where the device 200, 200' is realised with a reprogrammable computing machine, the corresponding program (that is the sequence of instructions) can be stored in a removable (such as, for example, an SD card, a USB flash drive, CD-ROM or DVD-ROM) or non-removable storage medium, this storage medium being partially or totally readable by a computer or a processor.

Finally, in relation to FIG. 12, an example of the hardware structure of a device 300 for encoding a data stream representative of a multiview video is presented, comprising a module for determining motion vectors of a texture image associated with a view of the multiview video, called current view, with respect to a reference texture image, a module for encoding the motion vectors in the data stream, a module for obtaining a depth image associated with said current view, captured by a depth camera, called captured depth image, a module for motion-compensating at least one block of a depth image associated with the current view, called constructed depth image, configured to be implemented when at least one motion vector has been obtained for at least one block of the texture image, said motion compensation being implemented from said at least one motion vector and at least one available reference depth image, said reference depth image being associated with the same view as said reference texture image; a module for evaluating a motion-compensated block of said reconstructed depth image by comparison with the co-located block of the captured depth image, a compensation error being obtained, and a module for encoding an item of information representative of a motion compensation flag of said at least one block of said depth image depending on a predetermined error criterion, said flag being set to a predetermined value when the error criterion is satisfied.

The term "module" can correspond to a software component as well as to a hardware component or a set of hardware and software components, a software component itself corresponding to one or more computer programs or subprograms, or more generally, to any element of a program capable of implementing a function or set of functions.

More generally, such a device 300 comprises a random access memory 303 (for example, a RAM memory), a processing unit 302 equipped for example with a processor and controlled by a computer program Pg3, representative of the decoding, motion compensation, evaluation and encoding modules, stored in a read-only memory 301 (for example, a ROM memory or hard disk). At initialisation, the code instructions of the computer program are for example loaded into a random access memory 303 before being executed by the processor of the processing unit 302.

FIG. 12 only shows a particular one of several possible ways of realising the device 300, so that it executes the steps of the method for encoding a data stream representative of a multiview video as detailed above, in relation to FIGS. 8 and 9 in its various embodiments. Indeed, these steps may be implemented indifferently on a reprogrammable computing machine (a PC computer, a DSP processor or a microcontroller) executing a program comprising a sequence of instructions, or on a dedicated computing machine (for example a set of logic gates such as an FPGA or an ASIC, or any other hardware module).

In the case where the device 300 is realised with a reprogrammable computing machine, the corresponding program (that is the sequence of instructions) can be stored in a removable (such as, for example, an SD card, a USB flash drive, CD-ROM or DVD-ROM) or non-removable storage medium, this storage medium being partially or totally readable by a computer or a processor.

The invention that has just been described in its different embodiments has many advantages. By proposing an alternative solution to conventional techniques for estimating a depth image from one or more decoded texture images, it helps to reduce the complexity of processing a data stream representative of a multiview video by a receiving item of terminal equipment. This advantage is achieved by using motion compensation of the depth image of a current view that reuses the motion vectors transmitted in the data stream for the corresponding texture image, associated with the same view.

In this way, the calculations are considerably simplified and the receiver's resources are preserved, which is particularly interesting for light terminal equipment, such as a mobile phone or a head-mounted device, whose resources are limited.

The invention claimed is:

1. A method implemented by at least one device and comprising:
   constructing at least one block of a depth image associated with a view of a multiview video, called current view, said depth image not being encoded in a data stream representative of said video, said stream comprising information representative of motion vectors of a texture image associated with said current view with respect to at least one reference texture image, said texture image having been divided into blocks, wherein the constructing comprises:

obtaining said motion vectors from the information encoded in the stream; and
   in response to at least one motion vector having been obtained for at least one block, called current block, of the texture image, constructing a block of the depth image, co-located with the current block, by motion compensation of at least one available reference depth image, pointed to by said at least one motion vector, said reference depth image being associated with a same view as said reference texture image.

2. The method according to claim 1, wherein the method comprises obtaining a motion compensation flag from an item of information encoded in the stream, said flag being associated with said block of the depth image and deciding to implement said motion compensation in response to the flag being set to a predetermined value.

3. The method according to claim 1, wherein the method comprises obtaining an identifier of the reference texture image by decoding an item of information encoded in the data stream and obtaining the reference depth image from said identifier.

4. The method according to claim 1, wherein the method further comprises:
   decoding the encoded information representative of the motion vectors of the texture image associated with said current view; and
   constructing the at least one block of the depth image associated with the current view at least from the decoded motion vectors.

5. The method according to claim 4, wherein the method comprises decoding an encoded item of information representative of a motion compensation flag of said at least one block of said depth image, said construction being implemented for said block in response to the flag being set to a predetermined value.

6. A method implemented by at least one device and comprising:
   encoding a data stream representative of a multi-view video, wherein the encoding comprises:
      determining motion vectors of a texture image associated with a view of the multiview video, called current view, with respect to a reference texture image, said texture image having been divided into blocks;
      encoding the motion vectors in the data stream;
      obtaining a depth image associated with said current view, captured by a depth camera, called captured depth image;
      constructing at least one motion-compensated block of a depth image associated with the current view, from at least one motion vector determined for at least one block of the texture image co-located with the block, called current block, wherein the constructing comprises:
         obtaining, from the data stream, the motion vectors encoded in the stream; and
         in response to at least one motion vector having been obtained for the current block, motion-compensating a block of the depth image, from said at least one motion vector and at least one available reference depth image, said reference depth image being associated with a same view as said reference texture image;
      evaluating the motion-compensated block of said constructed depth image by comparison with the co-located block of the captured depth image, a compensation error being obtained; and encoding an item of information representative of a motion compensation flag of said at least one block of said depth image depending on a predetermined error criterion, said flag being set to a predetermined value when the error criterion is satisfied.

7. A device comprising:
at least one processor; and
at least one non-transitory computer readable medium comprising instructions stored thereon which when executed by the at least one processor implement constructing at least one block of a depth image associated with a view of a multiview video, called current view, said depth image not being encoded in a data stream representative of said video, said stream comprising encoded information representative of motion vectors of a texture image associated with said current view with respect to at least one reference texture image, said texture image having been divided into blocks, wherein the constructing comprises:
obtaining said motion vectors from the information encoded in the stream; and
in response to at least one motion vector having been obtained for at least one block, called current block, of the texture image, constructing a block of the depth image, co-located with the current block, by motion compensation of at least one available reference depth image, pointed to by said at least one motion vector, said reference depth image being associated with a same view as said reference texture image.

8. The device according to claim 7, wherein the instructions further configure the at least one processor to:
decode the encoded information representative of the motion vectors of the texture image associated with said current view; and
construct the at least one block of the depth image associated with the current view.

9. A device comprising:
at least one processor; and
at least one non-transitory computer readable medium comprising instructions stored thereon which when executed by the at least one processor implement encoding a data stream representative of a multi-view video, wherein the encoding comprises:
determining motion vectors of a texture image associated with a view of the multiview video, called current view, with respect to a reference texture image, said texture image having been divided into blocks;
encoding the motion vectors in the data stream;
obtaining a depth image associated with said current view, captured by a depth camera, called captured depth image;
constructing at least one motion-compensated block of a depth image associated with the current view, or obtaining the at least one motion-compensated block having been constructed, from at least one motion vector determined for at least one block of the texture image co-located with the block by:
obtaining the motion vectors from the information encoded in the data stream; and
in response to at least one motion vector having been obtained for the current block, motion-compensating a block of the depth image, from said at least one motion vector and at least one available reference depth image, said reference depth image being associated with a same view as said reference texture image;

evaluating the motion-compensated block of said constructed depth image by comparison with the co-located block of the captured depth image, a compensation error being obtained; and
encoding an item of information representative of a motion compensation flag of said at least one block of said depth image depending on a predetermined error criterion, said flag being set to a predetermined value when the error criterion is satisfied.

10. A system for free navigation in a multiview video of a scene, comprising:
a device comprising:
at least one processor; and
at least one non-transitory computer readable medium comprising instructions stored thereon which, when executed by the at least one processor, implement a method comprising:
decoding a data stream representative of the multi-view video, said stream comprising encoded information representative of motion vectors of a texture image of a current view with respect to a reference texture image, said texture image having been divided into blocks, no depth image co-located with the texture image being encoded in the data stream, and
in response to at least one motion vector having been obtained for at least one block, called current block, of the texture image, constructing a block of a depth image, co-located with the current block, by motion compensation of at least one available reference depth image, pointed to by said at least one motion vector, said reference depth image being associated with a same view as said reference texture image; and
a module configured to synthesize a view according to a viewpoint chosen by a user from the decoded texture images and the constructed depth images.

11. Terminal equipment configured to receive an encoded data stream representative of a multiview video, the terminal equipment comprising:
a device comprising for free navigation in said multi-view video:
at least one processor; and
at least one non-transitory computer readable medium comprising instructions stored thereon which, when executed by the at least one processor, implement a method comprising:
decoding a data stream representative of the multi-view video, said stream comprising encoded information representative of motion vectors of a texture image of a current view with respect to a reference texture image, said texture image having been divided into blocks, no depth image co-located with the texture image being encoded in the data stream, and
in response to at least one motion vector having been obtained for at least one block, called current block, of the texture image, constructing a block of a depth image, co-located with the current block, by motion compensation of at least one available reference depth image, pointed to by said at least one motion vector, said reference depth image being associated with a same view as said reference texture image; and
a module configured to synthesize a view according to a viewpoint chosen by a user from the decoded texture images and the constructed depth images.

12. A non-transitory computer readable medium comprising instructions of a computer program stored thereon for implementing a method according to claim 1, when executed by a processor of the at least one device.

13. A non-transitory computer readable medium comprising instructions of a computer program stored thereon for implementing a method according to claim 6, when executed by a processor of the at least one device.

14. A method implemented by at least one device and comprising:

decoding a data stream representative of a multiview video, said stream comprising encoded information representative of motion vectors of a texture image of a current view with respect to a reference texture image, said texture image having been divided into blocks, no depth image co-located with the texture image being encoded in the data stream, wherein the decoding comprises:

decoding the encoded information representative of the motion vectors of the texture image associated with said current view; and transmitting the decoded information to a device comprising:

at least one processor; and at least one non-transitory computer readable medium comprising instructions stored thereon which, when executed by the at least one processor, implement constructing at least one block of a depth image associated with said current view, wherein the constructing comprises:

obtaining the motion vectors; and in response to at least one motion vector having been obtained for at least one block, called current block, of the texture image, constructing a block of the depth image, co-located with the current block, by motion compensation of at least one available reference depth image, pointed to by said at least one motion vector, said reference depth image being associated with a same view as said reference texture image.

15. A non-transitory computer readable medium comprising instructions of a computer program stored thereon for implementing a method according to claim 14, when executed by a processor of the at least one device.

* * * * *